US00RE39729E

(19) United States
(12) Reissued Patent
Miskech et al.

(10) Patent Number: US RE39,729 E
(45) Date of Reissued Patent: Jul. 17, 2007

(54) TAILGATE ASSEMBLY

(75) Inventors: Peter Miskech, Dearborn, MI (US); Joseph Paul Tekelly, Troy, MI (US); David Gary Dahlstrom, Grosspointe Farms, MI (US); Keith Alan Kuzmich, Commerce Township, MI (US)

(73) Assignee: Ford Global Technologies, LLC, Dearborn, MI (US)

(21) Appl. No.: 11/332,812

(22) Filed: Jan. 13, 2006

Related U.S. Patent Documents

Reissue of:
(64) Patent No.: 6,676,187
Issued: Jan. 13, 2004
Appl. No.: 10/065,493
Filed: Oct. 24, 2002

(51) Int. Cl.
*B62D 33/037* (2006.01)

(52) U.S. Cl. ..... 296/50; 296/146.8; 296/187.11; 49/501

(58) Field of Classification Search ..... 296/187.03, 296/187.11, 901, 187.01, 146.8, 146.6, 50, 296/57.1; 49/501
See application file for complete search history.

(56) References Cited

U.S. PATENT DOCUMENTS 4,188,058 A * 2/1980 Resa et al.
4,984,673 A * 1/1991 Saito et al.
5,372,397 A * 12/1994 Arndt ..... 296/39.2
5,429,410 A * 7/1995 Fleischer ..... 296/146.6
5,519,978 A * 5/1996 Sucato et al. ..... 52/731.9
5,575,525 A * 11/1996 Walworth et al.
5,660,427 A * 8/1997 Freeman et al. ..... 296/190.08
5,664,451 A * 9/1997 Schultz
5,730,486 A * 3/1998 Jurica
5,938,272 A * 8/1999 Jurica et al.
5,944,373 A * 8/1999 Seksaria et al. ..... 296/57.1
6,128,815 A * 10/2000 Jurica et al.
6,142,549 A * 11/2000 Clare et al.
6,170,905 B1 * 1/2001 Jurica
6,196,619 B1 * 3/2001 Townsend et al. ..... 296/146.6
6,227,609 B1 * 5/2001 Mellis ..... 296/146.6
6,231,100 B1 * 5/2001 Fournier ..... 296/57.1
6,308,411 B1 * 10/2001 Wright et al.
6,431,630 B1 * 8/2002 Meinke ..... 296/50
2003/0110705 A1 * 6/2003 Hlavach et al. ..... 49/501
2003/0155066 A1 * 8/2003 Roehr ..... 156/245

FOREIGN PATENT DOCUMENTS

JP 359186784 A * 10/1984 ..... 296/50
WO WO 01/66301 A1 * 9/2001

* cited by examiner

*Primary Examiner*—Lori L. Coletta
(74) *Attorney, Agent, or Firm*—Allan J. Lippa; Alleman Hall McCoy Russell & Tuttle LLP

(57) ABSTRACT

A tailgate assembly having an inner panel and an outer panel which is selectively coupled to the inner panel. The tailgate assembly further includes at least one stiffening member which is selectively and operatively contained between the panels and which increases the strength and durability of the tailgate assembly.

49 Claims, 4 Drawing Sheets

TAILGATE ASSEMBLY

Matter enclosed in heavy brackets [ ] appears in the original patent but forms no part of this reissue specification; matter printed in italics indicates the additions made by reissue.

BACKGROUND OF INVENTION

1. Field of the Invention

The present invention generally relates to a tailgate assembly and more particularly to a relatively strong and sturdy tailgate assembly which may be selectively and movably attached to a truck or other type of motor vehicle.

2. Background of the Invention

A tailgate assembly is usually and selectively attached to a truck or other type of motor vehicle having a storage bed or compartment. Particularly, the tailgate assembly is movable from a first closed position which allows materials or other items to be secured within the formed storage bed or compartment (i.e., the "closed" tailgate causes the formed storage bed or compartment to be selectively "closed"), to a second open position in which access is easily allowed to the storage bed or compartment (i.e., the "open" tailgate allows the formed storage bed or compartment to be selectively "opened"). While a conventional tailgate assembly does allow a formed storage bed or compartment to be selectively closed or opened, it does have some drawbacks.

By way of example and without limitation, a conventional tailgate assembly is typically susceptible to structural damage as it is impacted by items contained within the storage bed or as it is impacted by items or objects which reside outside of the formed storage bed, such as those items or objects which reside within the ambient environment through which the motor vehicle passes. Such damage is unaesthetically pleasing, undesirably requires costly repairs to be made to the vehicle by the owner of the vehicle, and, depending upon the severity of the impact, may also cause damage to occur to the items and materials which are contained in the formed storage bed or container e.g. the tailgate may be impacted in a manner which causes it to deformably contact some of the items which are stored in the formed compartment).

The present invention overcomes these drawbacks in a new and novel fashion.

SUMMARY OF INVENTION

It is a first non-limiting advantage of the present invention to provide a tailgate assembly which overcomes some or all of the previously delineated disadvantages of a conventional tailgate assembly.

It is a second non-limiting advantage of the present invention to provide a tailgate assembly including an inner panel; an outer panel; and at least one stiffening member which is operatively contained between the inner panel and the outer panel, the at least one stiffening member having a first flange portion which is coupled to the inner panel, a second flange portion which is coupled to the outer panel, and a broad face portion which is disposed between the first and second flange portions and which wholly resides within a single plane.

It is a third advantage of the present invention to provide a tailgate assembly comprising an outer panel which is symmetric about a certain plane of symmetry; an inner panel which is selectively coupled to the outer panel; and at least one stiffening member which is coupled to and which is operatively contained between the inner panel and the outer panel, the at least one stiffening members having a face portion which is perpendicular to the certain plane of symmetry.

It is a fourth advantage of the present invention to provide a tailgate assembly comprising an outer panel having an outer edge; an inner panel which is selectively coupled to the outer panel and which includes an outer edge; and a pair of substantially identical members which are coupled to the inner and outer panels, the pair of substantially identical members being linearly coextensive to both of the respective outer edges of the inner and outer panels and each of the pair of substantially identical members having a broad face portion which respectively forms a right angle with respect to each of the inner and outer panels, and each of the pair of substantially identical members having a pair of substantially identical flange portions which are respectively parallel to the outer edge of the inner panel and to the outer edge of the outer panel.

These and other features and advantages of the present invention will become apparent from a reading of the following detailed description of the preferred embodiment of the invention and by reference to the following drawings.

DETAILED DESCRIPTION

Figure 1:
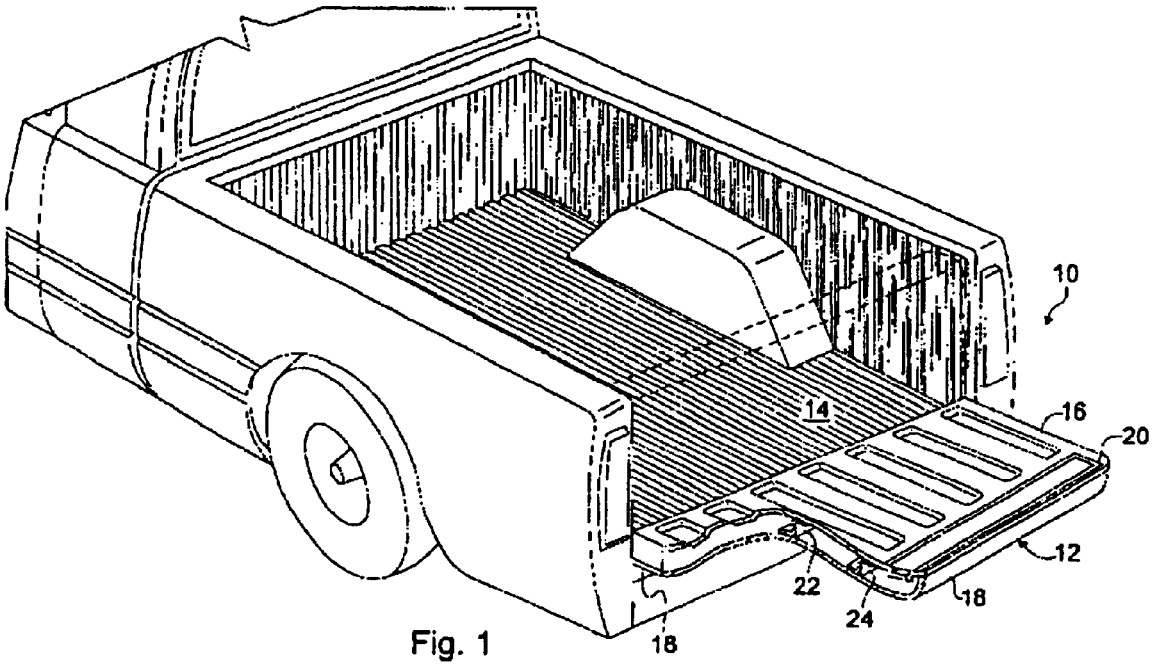
FIG. 1 is a perspective view of a vehicle including a tailgate assembly which is made in accordance with the teachings of the preferred embodiment of the invention.

Referring now to FIG. 1, there is shown a vehicle 10 having a tailgate assembly 12 which is made in accordance with the preferred embodiment of the invention. At the outset, it should be appreciated that the present invention is not limited to a certain vehicle type or configuration. Rather, the present invention may be used with a wide variety of dissimilar vehicles, including but not limited to the vehicle which is shown in FIG. 1, and, as such, the present invention has a wide variety of applications.

As shown, the vehicle 10 includes a storage bed or compartment 14 and the tailgate assembly 12 is movably coupled to the vehicle 10 by the use of hinges (not shown) or by the use of other devices or mechanisms which allow the tailgate assembly 12 to be selectively moved from a first closed position (shown in phantom in FIG. 1) in which access to the formed storage compartment 14 is restricted, to a second open position (shown in FIG. 1) in which access is readily allowed to the formed storage compartment 14. While the tailgate assembly 12 selectively allows access to the formed storage compartment 14 in substantially the same manner as a conventional tailgate assembly, it is stronger and structurally sturdier than a conventional tailgate assembly, as is further discussed below.

Figure 2:
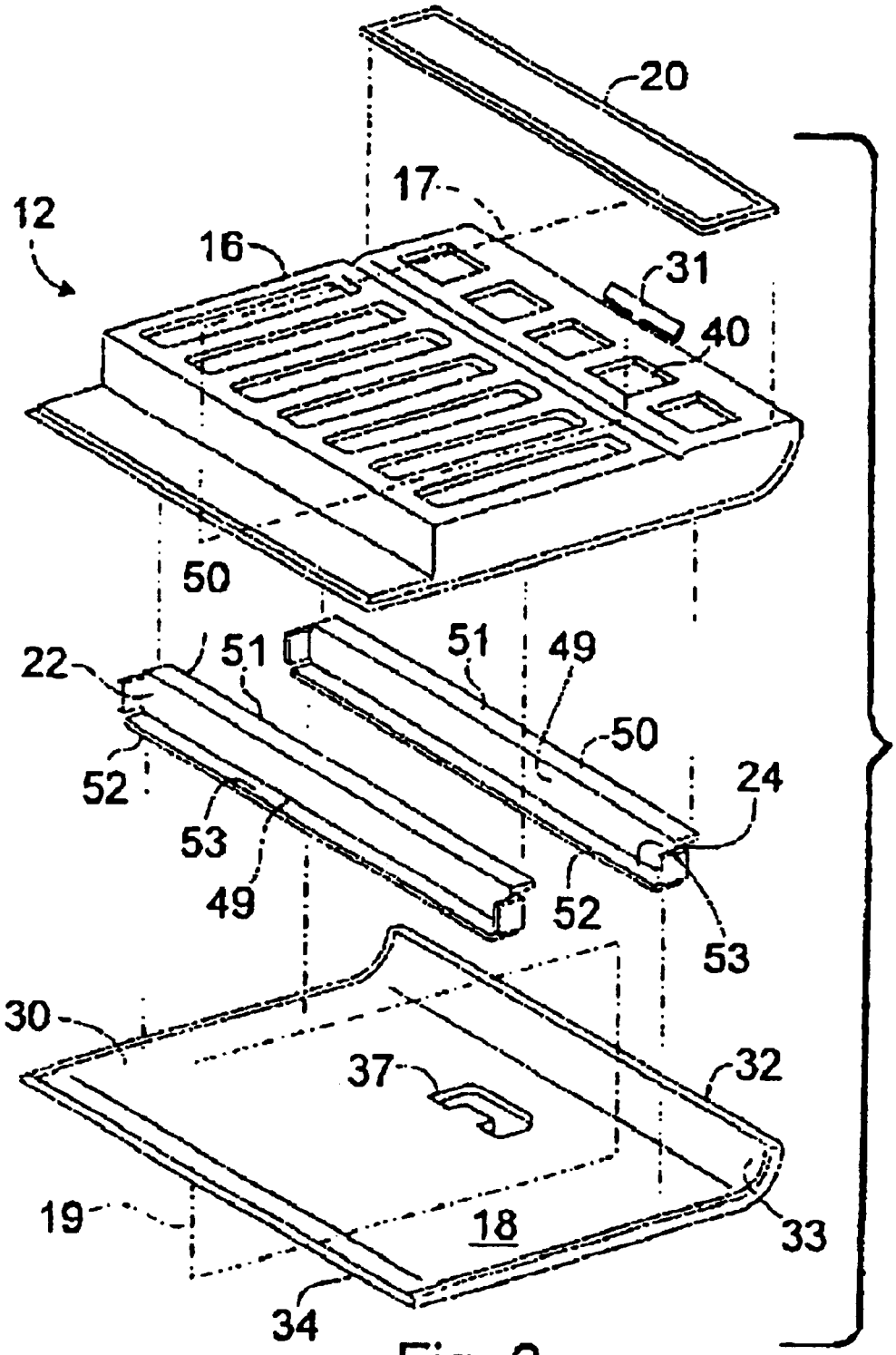
FIG. 2 is an unassembled perspective view of the tailgate assembly which is shown in FIG. 1.
Figure 3:
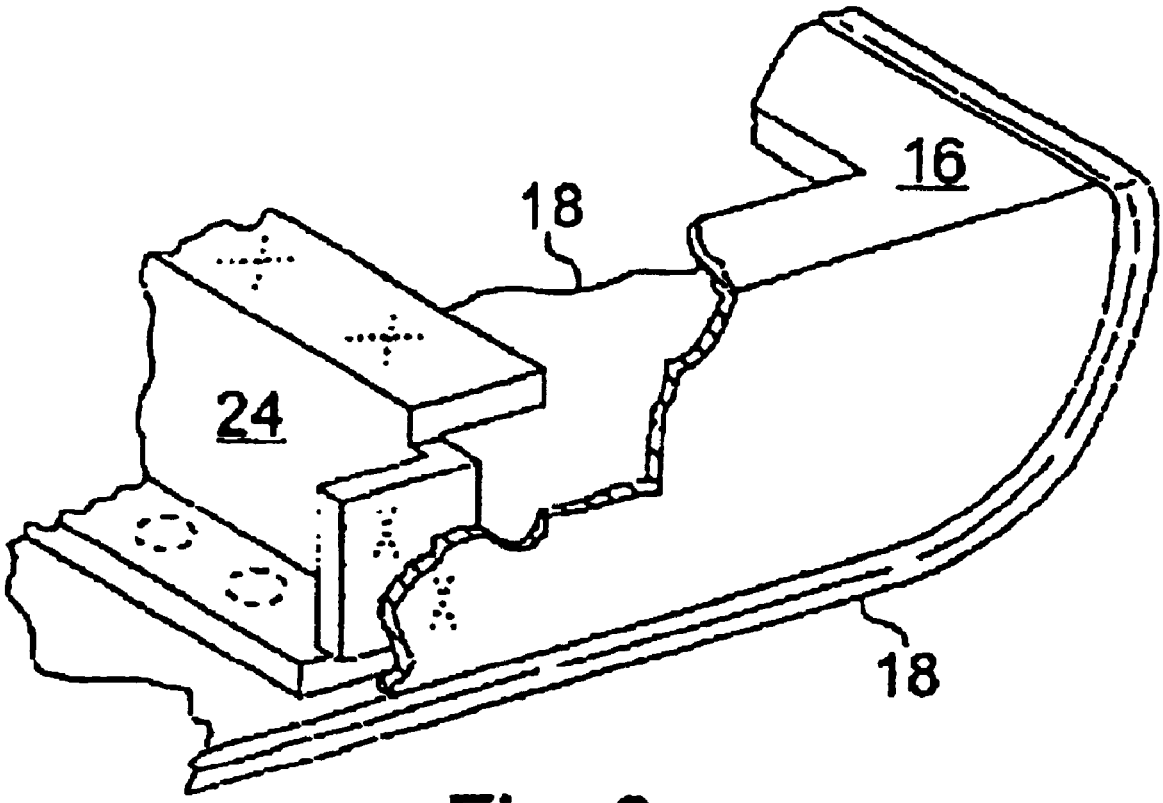
FIG. 3 is a partial perspective cut away view of the tailgate assembly which is shown in FIG. 1.
Figure 4:
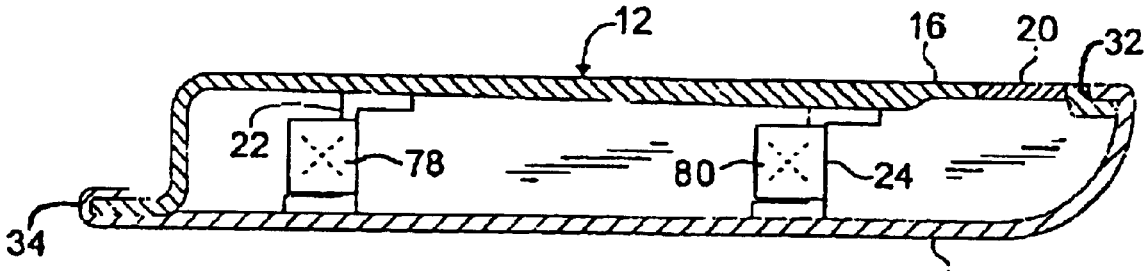
FIG. 4 is a side sectional view of the tailgate assembly which is shown in FIG. 1.

As is best shown in FIGS. 2, 3 and 4, the tailgate assembly 12 includes an inner panel 16, an outer panel 18, a cover panel 20, and a pair of substantially identical stiffening ribs or stiffening members 22, 24.

Particularly, as shown, the outer panel 18 has a body or broad face portion 30 with opposed outer edges 32, 34.

Particularly, outer edge 32 is formed upon a curled or lip portion 33 which causes the edge 32 to reside above the body 30, while edge 34 resides within substantially the same plane as the body 30. The inner panel 16 is substantially the same size as the body or broad face portion 30 of the outer panel 18 and has a shape which generally conforms to the shape of the body portion 30 of the outer panel 18. Further, in one non-limiting embodiment, the inner panel 16 includes several substantially identical apertures 40. It should be appreciated that nothing in this description is meant to limit the present invention to the exact shape, size, or geometric configuration associated with the panels 16, 18 which are shown in FIG. 2. Rather, these panels 16, 18 may be of any desired shape or configuration.

The cover panel 20, in one non-limiting embodiment, comprises a generally rectangular member, and each of the stiffening ribs 22, 24 respectively comprise members having a generally "Z" shaped cross sectional area. Particularly, members 22, 24 each have a respective generally planar body or broad face portion 49, a respective first edge 50 which is formed on a respective flange portion 51 which forms a right angle with respective portion 49, and a respective second edge 52 which is formed on a respective flange portion 53 which also forms a right angle with respect to respective portion 49. Edges 51, 52 of each members 22, 24 are parallel to edges 32, 34. It should be appreciated that, in one non-limiting embodiment, cover panel 20 may be eliminated. In yet another non-limiting embodiment, the panels 16, 18 and members 22, 24 may cooperatively and integrally form portions of a single member or panel assembly.

In operation, the respective flange portion 53 of each of the stiffening members 22, 24 are each attached to the body portion 30 of the outer panel 18 such that the respective edges 52 are parallel to the edges 32, 34 of the outer panel 18. The respective flange portions 51, 53 of each of the stiffening members 22, 24 are each attached to the panel 16 and the panel 16 is attached to the outer panel 18, thereby causing the respective edges 50 to be parallel to edges 32, 34 of the inner panel 16. In this manner, each of the respective broad face portions 49 respectively and wholly lie within a single plane and are each respectively perpendicular to the plane of symmetry 19 which passes through the outer panel 18 and to the plane of symmetry 17 which passes through the inner panel 16. Each of the respective portions 51, 53 are also perpendicular to the planes of symmetry 17, 19. The inner panel 16 is then attached to the outer panel 18 (by a mechanical attachment assembly or by a bonding material), effective to cause the stiffening members 22, 24 to be operatively "sandwiched" between these panels 16, 18. Further, one, three, or more such stiffening members may be used in alternate embodiments of the invention and, in the most preferred embodiment of the invention, each of the operatively contained members 22, 24 are parallel to and are linearly coextensive to the edges 32, 34 (i.e., each of the respective portions 49, 51, 53 are parallel to and linearly coextensive to the edges 32, 34). Further, in the most preferred embodiment of the invention, the distance between member 24 and edge 32 is substantially similar to the distance between the member 22 and the edge 34. The cover panel 20 is then attached to the inner panel 16 in a manner in which the cover panel 20 overlays and hides the apertures 40. Further, in one non-limiting embodiment of the invention, the outer panel 18 includes an opening 37 and the inner panel 16 includes a tab 31 which resides within and which protrudes from the opening 37 when the panels 16, 18 are coupled, effective to allow a user to open and close the tailgate assembly 12 by the use of the protruding tab 31.

Particularly, the stiffening members 22, 24 structurally strengthen the tailgate assembly 12, thereby reducing the likelihood of deformation and degradation. In particular, the "Z"-shaped cross sectional area of these members 22, 24 in combination with the placement of these members in a manner which is perpendicular to the planes of symmetry 17, 19 allows these members 22, 24 to greatly strengthen the tailgate assembly 12, thereby making the tailgate assembly 12 resistant to damage. Moreover, the length of each of the members 22, 24 (i.e., the fact that they are linearly co-extensive to edges 32, 34) further increases the stiffness of the tailgate assembly 12. In one non-limiting embodiment, each of the members 22, 24, are made or created from steel or another relatively strong and rigid material and are respectively attached to the panels 16, 18 by glue or another conventional adhesive material, by a welded connection, or by any combination of conventional coupling techniques or methodologies. Alternatively, a strong and rigid composite material may be used to create members 22, 24. For example, in one non-limiting embodiment, flanges 51 are respectively welded to the panel 16 while flanges 53 are respectively bonded to the panel 18. Further, the panel 16 may be selectively attached to the panel 18 by glue or a conventional adhesive material, or by the use of conventional fastening members. Further, in one non-limiting embodiment, member 22 has a pair of substantially identical, opposed, and generally rectangular end flanges 78, which are selectively attached to panel 16 while member 24 has a pair of substantially identical, opposed, and generally rectangular end flanges 80 which are similarly and selectively attached to panel 16. Such attachment may be made by the use of a welded connection or by a bonding material. It should be appreciated that the end flanges 78, 80 further increase the stiffness of the formed tailgate assembly 12 by ensuring that members 22, 24 are "tightly coupled" to the panels 16, 18. These members 22, 24, when operatively contained between panels 16, 18, act to absorb and/or distribute and dissipate the various forces applied to the tailgate assembly 12, thereby reducing the likelihood of damage to the tailgate assembly 12.

It should be appreciated that the apertures 40 allow an assembler to determine whether the members 22, 24 are correctly and operatively placed between the panels 16, 18 before the coupled panels 16, 18 are placed upon the vehicle 10. After the determination is made, panel 20 "hides" these apertures 40 and may be attached to the panel 16 by glue or by an adhesive material. Further, in yet another non-limiting embodiment of the invention, members 22, 24 respectively comprise "I" beams and have a generally "I"-shaped cross sectional area.

It is understood that the invention is not limited to the exact construction and methodology which is disclosed above but that various constructions may be made without departing from the spirit and the scope of the invention as is delineated in the following claims.

What is claimed is:

1. A tailgate assembly comprising an inner panel;

an outer panel; and at least one stiffening member which is operatively contained between said inner panel and said outer panel, said at least one stiffening member having a first flange portion which is coupled to said inner panel, a second flange portion which is coupled to said outer panel, and a broad face portion which is disposed between the first and second flange portions and which wholly resides within a single plane.

2. The tailgate assembly of claim 1 wherein said at least one stiffening member has a generally Z-shaped cross sectional area and a pair of substantially identical, opposed, and generally rectangular end flanges which are selectively coupled to said inner panel.

3. The tailgate assembly of claim 2 wherein said at least one stiffening member is linearly coextensive with said inner and outer panels.

4. The tailgate assembly of claim 3 wherein said at least one stiffening member is formed from steel.

5. The tailgate assembly of claim 4 wherein said at least one stiffening member is glued to said outer panel.

6. The tailgate assembly of claim 1 wherein said at least one stiffening member has a generally "I" shaped cross sectional area.

7. A tailgate assembly comprising an outer panel which is symmetric about a certain plane of symmetry; an inner panel which is selectively coupled to said outer panel; and at least one stiffening member which is coupled to and which is operatively contained between said inner panel and said outer panel, said at least one stiffening member having a face portion which is perpendicular to said certain plane of symmetry.

8. The tailgate assembly of claim 7 wherein said at least one stiffening member has a generally Z-shaped cross sectional area and a pair of substantially identical, opposed, and generally rectangular end flanges which are selectively coupled to said inner panel.

9. The tailgate assembly of claim 7 wherein said at least one stiffening member has an "I" shaped cross sectional area.

10. The tailgate assembly of claim 8 wherein said at least one stiffening member is linearly coextensive with said inner and outer panels.

11. The tailgate assembly of claim 10 wherein said at least one stiffening member is formed from steel.

12. The tailgate assembly of claim 11 wherein said at least one stiffening member is glued to said outer panel.

13. The tailgate assembly of claim 7 wherein said inner panel is symmetric about a second plane of symmetry and wherein said face portion is perpendicular to said second plane of symmetry.

14. A tailgate assembly comprising an outer panel having a first outer edge;

an inner panel which is selectively coupled to said outer panel and which includes a second outer edge; and a pair of substantially identical members which are coupled to said inner and outer panels, said pair of substantially identical members being linearly coextensive to both of said respective outer edges of said inner and outer panels each of said pair of substantially identical members having a broad face portion which respectively forms a right angle with respect to each of said inner and outer panels, and each of said pair of substantially identical members having a pair of substantially identical flange portions which are respectively parallel to said first outer edge and said second outer edge.

15. The tailgate assembly of claim 14 wherein each of said pair of substantially identical members has a generally Z-shaped cross sectional area and opposed and substantially identical end flanges.

16. The tailgate assembly of claim 15 wherein each of said pair of substantially identical members are formed from steel.

17. The tailgate assembly of claim 16 wherein each of said pair of substantially identical members are glued to said outer panel.

18. The tailgate assembly of claim 14 wherein said inner panel includes a plurality of apertures.

19. The tailgate assembly of claim 18 further comprising a cover panel which selectively covers said apertures and which is selectively attached to said inner panel.

20. The tailgate assembly of claim 19 wherein said outer panel includes aperture and wherein said inner panel includes a tab which is selectively received by said aperture of said inner panel.

*21. A tailgate assembly comprising:*

*an inner panel having at least an outer edge;*

*an outer panel having at least an outer edge; and*

*at least one stiffening member which is operatively contained between said inner panel and said outer panel, said at least one stiffening member having a first flange portion which is coupled to said inner panel, a second flange portion which is coupled to said outer panel, and a body portion which is disposed between the first and second flange portions;*

*where the outer edge of the outer panel is folded over the outer edge of the inner panel, thereby further coupling the inner panel and outer panel.*

*22. The tailgate assembly of claim 21 wherein the stiffening member is welded to the inner panel and bonded to the outer panel.*

*23. The tailgate assembly of claim 21 further comprising a second stiffening member which is operatively contained between said inner panel and said outer panel, wherein said second stiffening member has a first flange portion which is coupled to said inner panel, a second flange portion which is coupled to said outer panel, and a body portion which is disposed between the first and second flange portions, where said second stiffening member is substantially parallel to said at least one stiffening member.*

*24. The tailgate assembly of claim 21 wherein the inner panel has a plurality of surface depressions, and the at least one stiffening member is attached to said surface depressions formed in the inner panel.*

*25. The tailgate assembly of claim 24 wherein the plurality of surface depressions are substantially rectangular and evenly spaced.*

*26. The tailgate assembly of claim 25 wherein the surface depressions are elongate in a direction generally perpendicular to a width of the tailgate, and where there are at least 7 surface depressions.*

*27. The tailgate assembly of claim 24 wherein the stiffening member is elongate and oriented generally perpendicular to the surface depressions formed in the inner panel.*

*28. The tailgate assembly of claim 21 wherein said body portion of the stiffening member has a broad face.*

*29. The tailgate assembly of claim 21 wherein said body portion of the at least one stiffening member wholly resides within a single plane.*

*30. A tailgate assembly comprising:*

*an inner panel having at least an outer edge;*

*an outer panel having at least an outer edge; and*

*at least one stiffening member which is operatively contained between said inner panel and said outer panel, said at least one stiffening member having a first flange portion which is coupled to said inner panel, a second flange portion which is coupled to said outer panel, and a body portion which is disposed between the first and second flange portions;*

*where said first flange portion is generally parallel to said inner panel and said second flange portion is generally parallel to said outer panel.*

*31. The tailgate assembly of claim 30 wherein said first flange portion is welded to the inner panel and said second flange portion is bonded to the outer panel.*

*32. The tailgate assembly of claim 30 further comprising a second stiffening member which is operatively contained between said inner panel and said outer panel, wherein said second stiffening member has a first flange portion which is coupled to said inner panel, a second flange portion which is coupled to said outer panel, and a body portion which is disposed between the first and second flange portions, where said second stiffening member is substantially parallel to said at least one stiffening member; and where the outer edge of the outer panel is folded over the outer edge of the inner panel, thereby further coupling the inner panel and outer panel.*

*33. The tailgate assembly of claim 32 wherein the inner panel has a plurality of surface depressions, and the at least one stiffening member is attached at said surface depressions formed in the inner panel, wherein the plurality of surface depressions are substantially rectangular and evenly spaced, and wherein the surface depressions are elongate in a direction generally perpendicular to a width of the tailgate.*

*34. The tailgate assembly of claim 33 wherein said body portion of the stiffening member has a broad face that wholly reside within a single plane.*

*35. A tailgate assembly comprising:*

*an inner panel having a body with opposed outer edges;*

*an outer panel having a body with opposed outer edges, where at least one outer edge of the outer panel is formed upon a lip portion which causes the outer edge to reside above a portion of the body of the outer panel; and*

*at least one stiffening member which is operatively contained between said inner panel and said outer panel, said at least one stiffening member having a first flange portion which is coupled to said inner panel, a second flange portion which is coupled to said outer panel, and a body portion which is disposed between the first and second flange portions;*

*where the opposed outer edges of the outer panel are folded over the opposed outer edges of the inner panel thereby further coupling the inner panel and outer panel, and where an upper edge of the tailgate is formed from the lip portion of the outer panel.*

*36. The tailgate assembly of claim 35 wherein an upper half of the inner panel includes at least five apertures of substantially similar size, where the apertures are positioned adjacent one another and collectively span substantially an entire width of the inner panel.*

*37. The tailgate assembly of claim 36 wherein at least one of the apertures is centrally positioned along the width of the inner panel, with two other of the apertures being positioned to each side of the central aperture.*

*38. The tailgate assembly of claim 35 wherein the outer panel includes an opening configured to allow a user to open and close the tailgate assembly.*

*39. The tailgate assembly of claim 38 further comprising a tab coupled to the inner panel, the tab residing within an opening of the outer panel when the inner and outer panels are coupled, the tab being adapted to allow a user to open and close the tailgate assembly.*

*40. The tailgate assembly of claim 39 wherein the inner panel has a plurality of surface depressions, wherein the plurality of surface depressions are substantially rectangular and evenly spaced, and wherein the surface depressions are elongate in a direction generally perpendicular to a width of the tailgate.*

*41. The tailgate assembly of claim 40 wherein said first flange portion is welded to the inner panel and said second flange portion is bonded to the outer panel.*

*42. The tailgate assembly of claim 40 wherein the stiffening members is elongate and oriented generally perpendicular to the surface depression formed in the inner panel, and where the stiffening member is made of steel and structurally strengthens the tailgate assembly.*

*43. The tailgate assembly of claim 35 where the stiffening member flange that is coupled to the inner panel extends upward from the body portion of the stiffening member at substantially a right angle and the stiffening member flange that is coupled to the outer panel extends downward from the body portion of the stiffening member at substantially a right angle.*

*44. The tailgate assembly of claim 43 wherein the inner panel is substantially the same size as the outer panel.*

*45. The tailgate assembly of claim 43 wherein the inner panel is substantially the same shape as the outer panel.*

*46. A tailgate assembly comprising:*

*an inner panel having at least an outer edge and a plurality of surface depressions formed therein;*

*an outer panel having at least an outer edge;*

*a first stiffening member which is operatively contained between said inner panel and said outer panel, and which is elongate and oriented generally perpendicularly to the surface depressions formed in the inner panel, said first stiffening member having a first flange portion which is coupled to the inner panel at at least some of the surface depressions formed in the inner panel, a second flange portion which is coupled to said outer panel, and a body portion which is disposed between the first and second flange portions; and*

*a second stiffening member which is operatively contained between said inner panel and said outer panel, wherein said second stiffening member has a first flange portion which is coupled to said inner panel, a second flange portion which is coupled to said outer panel, and a body portion which is disposed between the first and second flange portions, where said second stiffening member is substantially parallel to said at least one stiffening member;*

*where the outer edge of the outer panel is folded over the outer edge of the inner panel, thereby further coupling the inner panel and outer panel.*

*47. The tailgate assembly of claim 46, where for each of the first and second stiffening members, the first flange portion is welded to the inner panel and the second flange portion is bonded to the outer panel.*

*48. The tailgate assembly of claim 46 wherein the plurality of surface depressions are substantially rectangular and evenly spaced.*

*49. The tailgate assembly of claim 48 wherein the surface depressions are elongate in a direction generally perpendicular to a width of the tailgate, and where there are at least 7 surface depressions.*

* * * * *